United States Patent
Alexander et al.

[15] 3,645,402
[45] Feb. 29, 1972

[54] LIQUID COOLANT CONDITIONER

[72] Inventors: Willis Alexander, Hagerstown, Md.; Robert J. Shaltis, Hastings, Mich.

[73] Assignees: Mack Trucks, Inc., Allentown, Pa. by said Alexander; Hastings Manufacturing Company, Hastings, Mich., by said Shaltis

[22] Filed: Dec. 10, 1970

[21] Appl. No.: 96,866

[52] U.S. Cl...............................210/266, 210/311, 210/438
[51] Int. Cl.........................................................B01d 25/06
[58] Field of Search.................210/266, 335, 488, 502, 438, 210/439, 198, 317, 314, 311

[56] References Cited

UNITED STATES PATENTS

| | | | |
|---|---|---|---|
| 3,132,501 | 5/1964 | Jacobs et al | 210/335 X |
| 3,279,607 | 10/1966 | Michaelson | 210/223 |
| 2,529,398 | 11/1950 | Krieck | 210/438 X |

*Primary Examiner*—J. L. DeCesare
*Attorney*—Munson H. Lane and Munson H. Lane, Jr.

[57] ABSTRACT

This invention discloses a disposable-type filter particularly adapted for use in the coolant system of internal combustion engines, the filter including a housing having a support plate provided with a central interiorly threaded outlet neck and with inlet passages spaced radially from said neck, a rigid canister provided in said housing in spaced relation from said support plate, a stepped tubular adapter seated over said outlet neck and separating said canister from said support plate, and a spring mounted in said housing pressing said canister and said adapter toward said support plate. In accordance with the invention the canister includes a central tube which is perforated adjacent one end, a perforated bottom end plate, an imperforate top end plate, and an imperforate exterior tubular wall, said end plates being rigidly joined to the exterior and central tubes. The canister is separated into two interior chambers by an annular perforated partition. The bottom chamber is filled with a depth medium of filtering material such as wood wool, rayon fibers, or the like, on top of which rests a cathodic anode disc. The top chamber is provided with a chemical package including ion exchange beads and soluble corrosion prevention chemicals. The flow of liquid within the filter is through the inlet passages into the space between the top of the canister and the support plate, down between the outside of the canister and the housing to the bottom of the housing, upwardly in series through the perforated bottom end plate, the depth filtering media, the anode disc, the transverse partition into the chemical package, radially inwardly from the chemical package through the perforations in the central tube, upwardly through the central tube and thus out of the filter through the outlet neck.

42 Claims, 5 Drawing Figures

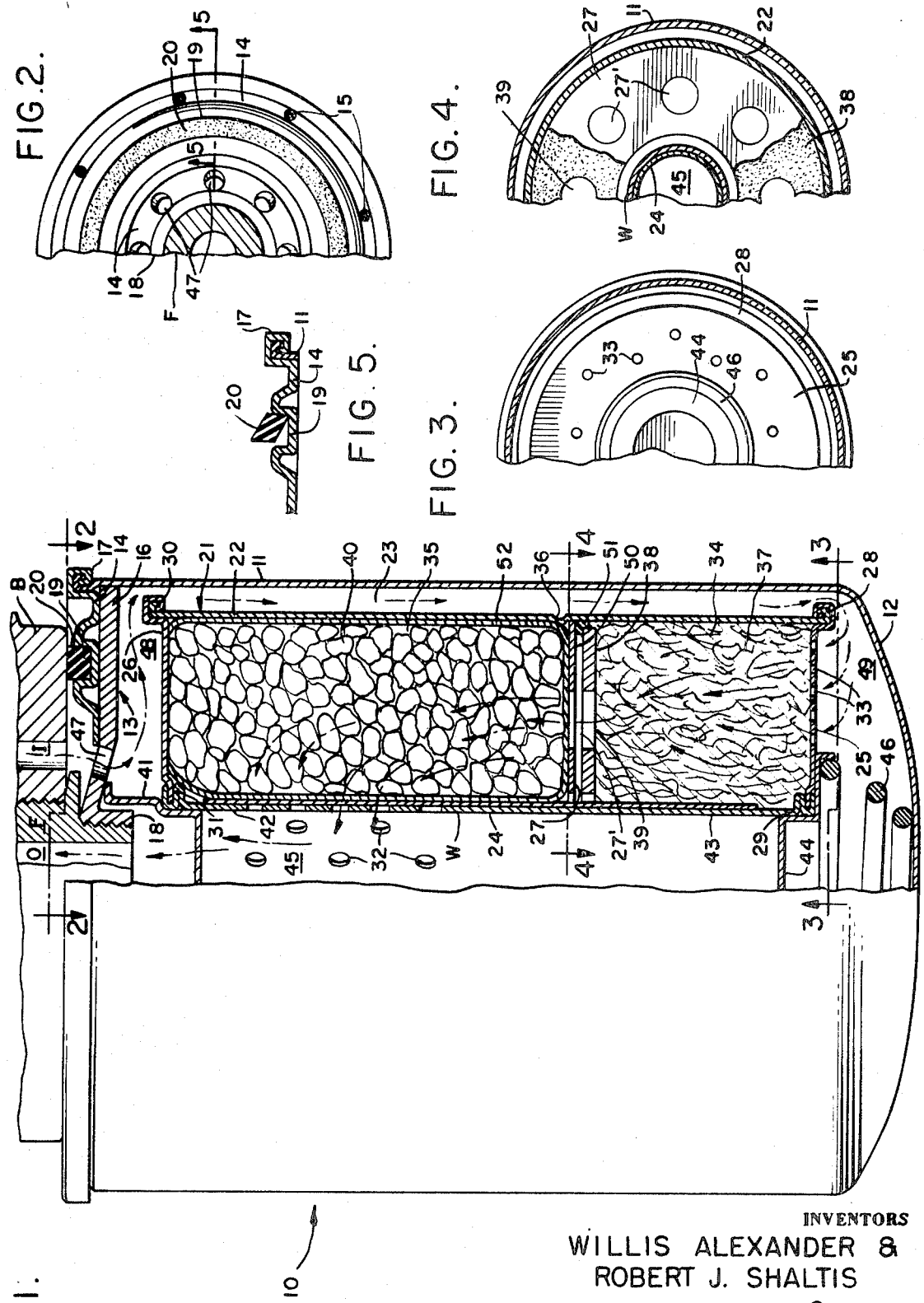
PATENTED FEB 29 1972
3,645,402
INVENTORS
WILLIS ALEXANDER &
ROBERT J. SHALTIS
BY Munson H. Lane
ATTORNEY

LIQUID COOLANT CONDITIONER

This invention relates to new and useful improvements in filters, particularly water filters, for use in the water cooling system of internal combustion engines, and a principal object of the invention is to provide a disposable-type water filter embodying a spin-on-type housing and a novel interior filter canister which encloses a depth filter medium for separating solid impurities from the water, a cathodic anode, and a chemical medium giving corrosion protection to the engine.

It is another object of the invention to provide a filter means which is pendantly supported in fluid communication with the liquid coolant, particularly tapwater, in the liquid coolant system of an internal combustion engine.

It is another object of the invention to provide an improved filter having a sacrificial anode uniquely held in a metal filter canister.

It is another object of the invention to provide an improved liquid coolant filter of the spin-on filter-type having a filter canister within a spin-on casing in which the liquid coolant enters the filter casing at one end, flows around the canister to the other end of the casing where it reverses direction throwing off heavy suspended particles in the process, and then flows axially through the major portion of the filter canister, and then radially inwardly through a perforated end of a central canister tube, and then out the filter casing at the same end by which it entered.

With the foregoing more important objects and features in view and such other objects and features as may become apparent as this specification proceeds, the invention will be understood from the following description taken in conjunction with the accompanying drawing, wherein like characters of reference are used to designate like parts; and wherein:

FIG. 1 is a side elevation with parts in section of a spin-on disposable filter and interior canister of the present invention;

FIG. 2 is a sectional view taken along section line 2—2 of FIG. 1, but on a reduced scale;

FIG. 3 is a sectional view taken along section line 3—3 of FIG. 1, but on a reduced scale;

FIG. 4 is a sectional view taken along section line 4—4 of FIG. 1, but on a reduced scale, and with a portion broken away; and FIG. 5 is a sectional view taken on line 5—5 of FIG. 2 showing the gasket in normal position before it is compressed.

Referring now to the accompanying drawings in detail, the disposable-type filter of the invention is designated generally by the numeral 10.

The filter 10 comprises a spin-on shell or cylindrical housing 11 formed integrally with a closed, dome-shaped bottom end 12, while the upper end is closed by a support plate assembly 13 which includes an annular top plate member 14 of relatively thin material secured, as by spot welding 15, or the like, to the upper side of a relatively thick-reinforcing support plate member 16. The upper end of the housing 11 is lock seamed and sealed as at 17 to the top plate member 14 and hence to the support plate 16 itself as will be clearly apparent.

The support plate member 16 is provided with an inwardly projecting, internally screw-threaded, centrally disposed outlet neck 18, by which the entire filter is pendantly connected to an exteriorly threaded adapter fitting F mounted on a suitable support B such as the engine block in communication with the bypass liquid coolant system of an internal combustion engine through the inlet passages I. The support plate member 14 is shaped to provide an upwardly opening annular groove 19 having a tapered annular gasket 20 seated therein, this gasket being adapted to sealingly engage the engine block B when the neck 18 of the filter is screwed up tight on the aforementioned adapter fitting F in the well-known manner.

The invention concerns itself primarily with the filter canister 21 and its contents which is positioned in the filter housing 11. The canister 21 includes an imperforate exterior tubular wall of smaller exterior diameter than the interior diameter of the housing 11 so as to provide an annular axial flow passage 23 for liquid between the canister exterior tubular wall 22 and the housing 11; a central tube 24 provided with perforations 32 adjacent its upper end only; an annular bottom end plate 25 provided with perforations 33; an imperforate annular top end plate 26; and a transverse perforated annular partition 27. The bottom and top end plates 25 and 26 are rigidly connected to the exterior wall 22 and central tube 24 by lock seams 28,29 and 30,31 respectively. The partition plate 27 separates the canister interior into first and second canister chambers 34 and 35, and it is held in position within the canister by means of a rolled indentation 36 provided in the canister's exterior wall 22.

The bottom chamber 34 is provided with a depth filter medium 37 of wood wool, rayon fibers or the like filter material and functions to remove solid materials suspended in the water of the engine cooling system. An annular cathodic anode disc 38 provided with perforations 39 is also positioned in the bottom chamber 34 between the partition plate 27 and the depth filter medium 37. The cathodic anode 38 is made of magnesium or other metal such as zinc high in the electrochemical series with respect to iron and constituting an anode in contact with the cooling medium for preventing corrosion of the engine metal by galvanic current flow. The anode disc 38 is seated against the shoulder 50 provided in the annular metal ring 51 which is secured to the interior of the canister wall 22 immediately below the indentation 36. The anode 38 is thus electrically grounded to the metal canister 22 through the metal ring 51 which is made of electrically conductive material.

The upper chamber 35 is provided with a chemical package 40 which is a commercial preparation including ion exchange beads, such as zeolite and soluble, corrosion prevention chemicals which give corrosion protection to the engine.

A suitable corrosion preventing chemical material is that manufactured by Nalco Chemical Company and sold under the trade name "Nalco 39" in pulverized, or pellet form. However other corrosion preventing chemicals which are known to those skilled in the art can be used. The chemical package including ion exchange resins and soluble corrosion preventing chemicals may include a porous fabric bag 52 enveloping the chemicals as shown in FIG. 1, or the bag may be omitted and the chemicals placed in the chamber 35 of the canister, providing only a muslin cloth over the sheet metal partition 27 in which case the muslin barrier would be glued to the sheet metal partition plate 27. A dye may be added to the chemical package to color the cooling water so that it is visible to a sight glass which is part of the engine system.

The outer surface of the central tube 24 is wrapped with a fabric material W such as muslin cloth which serves as a migration barrier for the materials in the canister. Preferably the wrapper is glued to the central tube.

The preferred corrosion preventing chemicals are soluble pellets or particles which dissolve in water and form a corrosion preventing coating on the interior passages of the liquid coolant system.

The canister 21 is positioned within the housing 11 in spaced relation from the support plate 16 by means of a stepped tubular adapter 41. The enlarged upper end of the adapter fits closely surrounding the outlet neck 18, and the reduced bottom end of the adapter fits closely within the perforated end 42 of the central tube 24. The opposite end 43 of the central tube 24 is closed by a cap 44 press fitted therein as shown, which with the central tube defines a central outlet chamber 45 within the canister. The cap 44 also provides a seat for a relatively strong compression spring 46 which bears against the bottom end of the housing 11 and urges the canister upwardly in the housing leaving space between the bottom of the canister and the bottom of the housing.

The housing 11 defines around the outside of the canister 21 an inlet chamber 48 communicated by a plurality of inlet passages 47 formed in the support plate 16 in radially spaced relation from the outlet neck 18. Thus liquid flow through the filter as indicated by the arrows is from the inflow passages I in the support B through the inlet passages 47 into the space 48 between the upper end of the canister and the support plate 16, down through the annular passage 23 and into the space 49 between the bottom of the canister and the bottom of the housing where the liquid flow reverses direction and flows upwardly in series through the perforated end plate 25, the depth filter medium 37, the perforated anode disc 38, the partition 27, the chemical package 35, and then radially inwardly through the perforations 32 into the central chamber 45 and finally upwardly through the open upper end of the tube 24 and through the central outlet 18 into the outlet flow passage O in the support B. The liquid flow when changing directions at the bottom of the filter gives up the heavier particles suspended in the liquid which settle to the bottom of the housing 11. The depth filter medium 37 serve to further remove additional solid particles suspended in the liquid, and the chemical package serves to treat the water to reduce the corrosiveness of the water in the engine cooling system.

The internal surface of the spin-on housing 11 will be corrosion protected as will be the support plate 16.

While the filter as described and illustrated herein is particularly adapted for filtering and treating the water in an internal combustion engine cooling system it is within the scope of this invention that the invention have other uses for filtering and treating liquids not limited to internal combustion engine cooling liquids.

The filter 10 is preferably connected in a bypass of the internal combustion engine cooling system rather than directly in series with the water as it flows through the engine, however, the invention is not limited to use in a bypass cooling system.

The housing 11, adapter 41, canister parts including central tube 24, exterior tube 22, end plates 25 and 26, partition 27, and annular ring 51 are made of metal, preferably steel.

The liquid coolant for which this filter is adapted includes not only tapwater but other liquid coolants commonly used in internal combustion engines including for example antifreeze solutions such as alcohol or permanent antifreeze solutions of ethylene glycol.

The invention has been described in detail for the purpose of illustration but it will be obvious to those skilled in the art that numerous modifications and variations from the specific embodiment set forth may be resorted to without departing from the spirit of the invention in its broadest aspects.

For example while it is preferable to provide diverse types of liquid coolant treating means in the first and second canister chambers 34 and 35 respectively it would be possible to provide both types of liquid contact treating means, namely the chemical-treating means 40 and the depth filter media 37 in the form of a chemical package within each of the two canister chambers 34 and 35. Moreover each chemical package might include a sacrificial anode if desired and each chemical package might be placed within a fluid permeable bag.

Furthermore, somewhat similar filtering action might be obtained by redesigning the container around the same two chambers having the same treating means therein as presently described. Such redesign could be accomplished by removing the plug or cap 44 from the lower end of the central tube 24, plugging the central tube perforations 32, placing a gasket or other seal between the canister exterior wall 22 and the housing 11, and perforating the top end plate 26. Then by reversing the flow through the neck 18 and the passages 47, the coolant will pass through the various treating means in the same order to obtain similar filtering action. In particular, the coolant would enter the neck 18, pass down through the central tube 24 to the bottom of the housing where the liquid flow reverses direction, and flow upwardly in series through the perforated end plate 25, the depth filter media 37, the perforated anode disc 38, the partition 27, the chemical package 35, and then through the perforated top end plate 26 and finally out through the passages 47. Alternatively, the upper lateral exterior wall 22 could be perforated rather than the top end plate 26, the perforations being above the gasket between the wall 22 and the housing 11.

What is claimed is:

1. A disposable-type filter means for the liquid coolant in the cooling system of internal combustion engines comprising a filter housing adapted to be connected in the cooling system of an internal combustion engine so that at least part of the circulating coolant will pass through the filter, said housing including a shell portion closed at one end with an integral end member and at the other end with a support plate assembly, said support plate assembly having a centrally disposed screw threaded, tubular outlet neck and multiple inlet openings spaced radially outwardly from said outlet neck, a rigid canister provided in said housing and radially spaced inwardly from said shell to provide an annular flow passage, a tubular adapter disposed within said housing axially inwardly with respect to said tubular outlet neck and separating said canister from said support plate assembly, and a spring mounted in said housing and biasing said canister and said adapter toward said support plate assembly, said canister including a central canister tube disposed in axial alignment with said tubular adapter and said tubular outlet neck, one end of said central tube being open and communicating with said outlet through said tubular adapter, and end cup means closing the other end of said central tube, an imperforate exterior canister tube concentric with said central tube and radially spaced outwardly thereof, a perforated canister end plate adjacent the closed end of said central tube, and an imperforate canister end plate adjacent the open end of said central tube, means sealingly and rigidly connecting said canister end plates to the opposite ends of said central and exterior canister tubes respectively, an annular transverse partition separating said canister into first and second longitudinally spaced canister chambers, said partition having annularly arranged apertures extending therethrough, said first canister chamber being adjacent said perforated end plate of said canister, and said second canister chamber being adjacent said imperforate canister end plate, an inlet chamber in the space between the imperforate end of said canister and said support plate assembly, a flow reversing chamber in the space between the integrally closed end of said shell and said perforated end of said canister, an outlet chamber within said central tube, and radially extending apertures in said central tube adjacent said outlet end providing fluid communication only between said central tube and said second canister chamber, and diverse liquid coolant treating means in said first and second canister chambers.

2. A filter means as defined in claim 1 wherein the filter housing is of the spin-on type.

3. The filter set forth in claim 1 wherein said diverse liquid coolant treating means includes a depth filter medium in one of said canister chambers and a liquid-treating chemical package in the other of said canister chambers.

4. The filter means set forth in claim 3 wherein said liquid-treating chemical package includes ion exchange resin particles and a soluble chemical means for forming a corrosion protecting film on the interior surfaces of the liquid coolant passages in said internal combustion engine.

5. The filter means set forth in claim 3 wherein said chemical package includes a fluid permeable annular fabric bag fitted within said other canister chamber and enveloping said liquid-treating chemical materials.

6. The filter means set forth in claim 3 wherein said chemical package includes bulk chemicals packed within said other canister chamber, and a chemical migration barrier means wrapped around the radial outer surface of said central tube and over said transverse partition to prevent chemical migration.

7. The filter means set forth in claim 4 wherein said chemical package includes also a dye to color the liquid coolant to make it visible to the human eye.

8. The filter means set forth in claim 3 wherein said depth filter medium is a depth filtration material including wood wool.

9. The filter means set forth in claim 3 wherein said depth filter medium is a depth filtration material including rayon fibers.

10. The filter means set forth in claim 1 wherein a sacrificial anode is provided within said canister, said sacrificial anode being made of a metallic material which is higher in the electrochemical series with respect to the metal of the internal combustion engine with which the filter means is to be used for preventing corrosion of the engine by galvanic current flow.

11. The filter means set forth in claim 10 wherein said sacrificial anode is a perforated annular disc.

12. The filter means set forth in claim 11 wherein said first canister chamber is provided with said depth filter medium and second canister chamber is provided with said liquid treating chemical package and said sacrificial anode is provided in said first chamber between said depth filter medium and said transverse partition.

13. The filter means set forth in claim 12 wherein an annular detent is provided in said exterior canister tube adjacent one side of said partition to limit longitudinal motion of said partition in one direction.

14. The filter means set forth in claim 13 wherein an annular ring is secured to the interior surface of said exterior canister tube adjacent the other side of said partition to limit longitudinal motion of said partition in the other direction.

15. The filter means set forth in claim 14 wherein said annular ring has a recessed shoulder facing oppositely to said partition and said anode disc is seated on said recessed shoulder, said annular ring providing an electrical connection between said anode and said exterior canister tube.

16. The filter means set forth in claim 3 wherein said central tube is wrapped on its radially outer surface with a fluid permeable fabric means to provide a migration barrier for said liquid treating chemical package.

17. The filter means set forth in claim 1 in combination with an internal combustion engine having a liquid coolant system, and support means for pendantly supporting said filter means in fluid communication with the liquid coolant in said liquid coolant system.

18. The combination set forth in claim 17 wherein said coolant system includes a bypass of said internal combustion engine for a portion of the liquid coolant in said system and said filter means is located in said bypass.

19. The combination set forth in claim 17 wherein said support means includes fluid inflow passage means in sealed communication with said multiple inlet openings of said filter means and fluid outflow passage means in sealed communication with the outlet neck of said filter means.

20. The combination set forth in claim 17 wherein the liquid coolant is tapwater.

21. An improved filter element for use in a filter casing comprising a rigid canister, said canister including a central canister tube having one open end and another closed end, an imperforate exterior canister tube surrounding said central tube and radially spaced outwardly thereof; a perforated canister end plate adjacent said closed end of said central tube, and an imperforate canister end plate adjacent the open end of said canister tube, means sealingly and rigidly connecting said canister end plates to the opposite ends of said central and exterior canister tubes respectively, an annular transverse partition separating said canister into first and second longitudinally spaced canister chambers, said partition having apertures extending therethrough, said first canister chamber being adjacent said perforated end plate of said canister, and said second canister chamber being adjacent said imperforate canister end plate, and diverse liquid coolant treating means in said first and second canister chambers.

22. The filter set forth in claim 21 wherein said diverse liquid coolant treating means includes a depth filter medium in one of said canister chambers and a liquid-treating chemical package in the other of said canister chambers.

23. The filter means set forth in claim 22 wherein said liquid-treating chemical package includes ion exchange resin particles and a soluble chemical means for forming a corrosion protecting film on the interior surfaces of the liquid coolant passages in said internal combustion engine.

24. The filter means set forth in claim 22 wherein said chemical package includes a fluid permeable annular fabric bag fitted within said other canister chamber and enveloping said liquid treating chemical materials.

25. The filter means set forth in claim 22 wherein said chemical package includes bulk chemicals packed within said other canister chamber, and a chemical migration barrier means wrapped around the radial outer surface of said central tube and over said transverse partition to prevent chemical migration.

26. The filter means set forth in claim 23 wherein said chemical package includes also a dye to color the liquid coolant to make it visible to the human eye.

27. The filter means set forth in claim 22 wherein said depth filter medium is a depth filtration material including wood wool.

28. The filter means set forth in claim 22 wherein said depth filter medium is a depth filtration material including rayon fibers.

29. The filter means set forth in claim 21 wherein a sacrificial anode is provided within said canister, said sacrificial anode being made of a metallic material which is higher in the electrochemical series with respect to the metal of the internal combustion engine with which the filter means is to be used for preventing corrosion of the engine by galvanic current flow.

30. The filter means set forth in claim 29 wherein said sacrificial anode is a perforated annular disc.

31. The filter means set forth in claim 30 wherein said first canister chamber is provided with said depth filter medium and second canister chamber is provided with said liquid treating chemical package and said sacrificial anode is provided in said first chamber between said depth filter medium and said transverse partition.

32. The filter means set forth in claim 31 wherein an annular detent is provided in said exterior canister tube adjacent one side of said partition to limit longitudinal motion of said partition in one direction.

33. The filter means set forth in claim 32 wherein an annular ring is secured to the interior surface of said exterior canister tube adjacent the other side of said partition to limit longitudinal motion of said partition in the other direction.

34. The filter means set forth in claim 33 wherein said annular ring has a recessed shoulder facing oppositely to said partition and said anode disc is seated on said recessed shoulder, said annular ring providing an electrical connection between said anode and said exterior canister tube.

35. The filter means set forth in claim 22 wherein said central tube is wrapped on its radially outer surface with a fluid permeable fabric means to provide a migration barrier for said liquid treating chemical package.

36. The combination as set forth in claim 17 wherein the liquid coolant is an antifreeze solution.

37. The filter means as set forth in claim 21 wherein the filter casing is of the spin-on type.

38. An improved filter unit for liquid treatment comprising a filter housing having first and second opening means adjacent one end thereof for ingress and egress of liquid and also means for mounting said filter unit in its intended place of use, a liquid treatment element, and means for mounting said liquid treatment element in spaced relationship within said filter casing, said liquid treatment element comprising a rigid canister having radially spaced interior and exterior tubular walls and a pair of end walls rigidly connecting the opposite ends of said interior and exterior walls, said exterior tubular wall being imperforate, said interior wall being perforated for at least a portion of its length, said end wall adjacent the end having said opening means being imperforate and the opposite end wall being perforated, said interior and exterior walls together with said end walls defining an annular cavity, said interior tubular wall and said mounting means providing a first liquid passageway, and said exterior wall and the interior of said filter housing defining a second liquid passageway, access means adjacent one end of said canister providing liquid communication between said cavity and said first liquid passageway, and additional access means adjacent the other end of said canister providing communication between said cavity and said second liquid passageway and liquid treatment means within said cavity for conditioning said liquid, said first passageway being in communication with one of said first and second opening means and said second passageway being in communication with the other of said first and second opening means, said liquid treatment means including at least one annular sacrificial metal anode and at least one diverse liquid treatment material located within said cavity.

39. The filter unit as set forth in claim 38 wherein partition means is provided transversely of said cavity to divide said cavity into two chambers with said liquid treatment material in each chamber.

40. The filter unit as set forth in claim 39 wherein there is an annular sacrificial anode disc positioned adjacent said partition means.

41. The filter unit as set forth in claim 39 wherein the liquid treatment material in one of said chambers is diverse from the liquid treatment material in the other of said chambers.

42. The filter unit as set forth in claim 41 wherein the liquid treatment material in the one of said chambers includes ion exchange resin particles.

* * * * *